United States Patent [19]
Reichert et al.

[11] Patent Number: 5,288,474
[45] Date of Patent: Feb. 22, 1994

[54] PROCESS FOR THE PRODUCTION OF LEAD METAL NIOBATES

[75] Inventors: Karlheinz Reichert, Hornburg; Harald Kröger, Goslar, both of Fed. Rep. of Germany

[73] Assignee: H. C. Starck GmbH & Co. KG, Goslar, Fed. Rep. of Germany

[21] Appl. No.: 69,157

[22] Filed: May 28, 1993

[30] Foreign Application Priority Data

May 29, 1992 [DE] Fed. Rep. of Germany ....... 4217818

[51] Int. Cl.$^5$ ............................................ C01G 33/00
[52] U.S. Cl. .................................. 423/593; 252/62.9; 423/594; 423/595; 423/599; 501/134; 501/135
[58] Field of Search ............... 423/593, 594, 595, 599; 501/134, 135; 252/62.9

[56] References Cited

U.S. PATENT DOCUMENTS

| 3,231,328 | 1/1966 | Pechini | 252/62.9 |
| 4,696,810 | 9/1987 | Shiraski et al. | 423/593 |
| 4,874,598 | 10/1989 | Oda et al. | 252/62.9 |
| 5,168,095 | 12/1992 | Munakata et al. | 423/593 |

FOREIGN PATENT DOCUMENTS

| 0294991 | 6/1988 | European Pat. Off. | C01B 131/18 |
| 428387 | 5/1991 | European Pat. Off. | 423/593 |
| 1933331 | 1/1970 | Fed. Rep. of Germany | 252/62.9 |
| 3-257004 | 11/1991 | Japan | 423/593 |

OTHER PUBLICATIONS

Journal of the American Ceramic Society (vol. 67, No. 5) "Delectric Properties of Lead-Magnesium Niobate Ceramics" S. L. Swartz, T. R. Shrout, W. A. Schulze, and L. E. Cross, pp. 311-315.

Advances in Ceramics, vol. 21, Ceramic Powder Science, "Polymeric Synthesis of Lead Magnesium Niobate Powders"; H. U. Anderson, M. J. Pennell, and J. P. Guha; ®1987; pp. 91-98.

Applied Physics Letter-"Dielectric and Electro-Optic Properties of Lead Niobate" vol. 10, No. 5; W. A. Bonner, E. F. Dearborn, J. E. Geusic, H. M. Marcos and L. G. van Uitert, Mar. 1, 1967; pp. 163-165.

Communications of the American Ceramic Society-"Low Temperature Synthesis Route to MgNb$_2$O$_6$"; Harold. S. Horowitz; May 1988; pp. C250-C251.

Primary Examiner—Jack Cooper
Attorney, Agent, or Firm—Jerry Cohen; Harvey Kaye

[57] ABSTRACT

Process for the production of phase-pure highly reactive lead metal niobates of perovskite structure corresponding to the general formula Pb$_3$Me(II)Nb$_2$O$_9$ or Pb$_2$Me(III)NbO$_6$, where Me=Mg, Fe, Co, Ni, Cr, Mn, Cd, Cu and/or Zn, in which perovskite intermediates are formed from corresponding salt solutions, separated off, dried and calcined at temperatures of 500 to 1000° C.

8 Claims, No Drawings

PROCESS FOR THE PRODUCTION OF LEAD METAL NIOBATES

FIELD AND BACKGROUND OF THE INVENTION

This invention relates to a process for the production of phase-pure highly reactive lead metal niobates of perovskite structure corresponding to the general formula $Pb_3Me(II)Nb_2O_9$ or $Pb_2Me(III)NbO_6$, where Me=Mg, Fe, Co, Ni, Cr, Mn, Cd, Cu and/or Zn, in which perovskite intermediates are formed from corresponding salt solutions, separated off, dried and calcined at temperatures of 500° to 1000° C.

By virtue of their high dielectric constant and their high electrostrictive coefficient, ferroelectric, such as for example PbMg niobate, PbNi niobate or PbZn niobate, are playing an increasingly important role. Compounds such as these with their perovskite structure correspond to the general formula $Pb_3Me(II)Nb_2O_9$ or $Pb_2Me(III)NbO_6$, where Me=Mg, Fe, Co, Ni, Cr, Mn, Cd, Cu, Zn (Appl. Phys. Lett., 10(5) 163–165 (1967)).

There are several known processes for the production of complex ferroelectric perovskites with a transition metal belonging to the 5th secondary group:

According to J. Am. Ceram. Soc. 71 (5), C-250-C-251 (1988), the oxides are mixed and subsequently subjected to a solid-state reaction at very high calcination temperatures. It is extremely difficult to produce phase-pure perovskites containing more than 95% perovskite phase by these ceramic processes. A stable pyrochlore phase unavoidably occurs during this solid-state reaction. It is known from J. Am. Ceram. Soc. 67 (5) 311–314 (1984) that $Nb_2O_5$, for example, can be reacted with MgO in a preliminary solid-state reaction, a substantially phase-pure perovskite being obtained in the subsequent reaction with PbO in accordance with the following formulae:

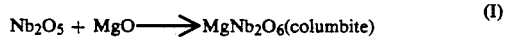

(I)

(II)

However, in view of the high temperatures of 1000° C. in the preliminary reaction to columbite, an only moderately reactive Mg niobate is obtained from the mixed oxides mentioned, so that the subsequent reaction with PbO can only be carried out successfully at relatively high temperatures. In the final production stage, the perovskite can only be sintered at temperatures of around 1200° C.

Wet chemical processes have proved to be of greater advantage for the production of complex perovskites. Thus, J. Am. Ceram. Soc. 72 (8), 1333–1337 (1989) describes the hydrolysis of an alkoxide mixture while Ep-A 294 991 describes co-precipitation from an alcoholic oxalic acid solution. The calcination of a gel produced from $NbCl_5$ or $Nb(OR)_5$ and metal salts by addition of $H_2O_2$ and citric acid is known from Advances in Ceramics, Vol. 21, 91–98 (1987). The co-precipitation method generally gives highly reactive intermediate products which react even at low temperatures to form the corresponding phase-pure perovskites. The sintering properties of these very fine powders are correspondingly good. However, these wet chemical processes have hitherto been extremely uneconomical.

Thus, the alkoxide method has the disadvantage that the starting materials are difficult to produce and handle.

In the oxalate method, it is not possible to co-precipitate all the components because problems arise through the considerable differences in the solubility of the metal oxalates in an alcohol/water mixture. Nevertheless, a very fine-particle powder having good sintering properties is obtained even in this method. The most serious disadvantage of the oxalate method lies in the very large quantities of alcohol required for quantitatively precipitating all the components. The poor solubility of niobium oxalate is another disadvantage. The known processes mentioned in the foregoing either have the disadvantages that the calcination and sintering temperatures are very high, as in the ceramic processes, or that significant complications and high costs are involved, as is the case with the wet chemical processes. The same also applies to the described citrate process. The known starting materials for this process are corresponding metal salts and niobium chloride or niobium alkoxide. It is only be addition of hydrogen peroxide (to form a water-soluble niobium peroxo complex) and citric acid that an aqueous gel can be produced from all the components together. In this process, however, co-precipitation is not possible because the metal complexes formed (metal/citrate complex and niobium/peroxocitrate complex) are extremely stable. Accordingly, the complexes do not decompose, even in the presence of excess ammonia. Some of the water-soluble Me citrate complexes are so stable (as, for example, where Me=Pb, Mg, Fe, Ni, Co, Mn, Nb, Ta, Zn, Cd citrate) that, when ammonia is added, the corresponding hydroxide does not precipitate. Binary mixtures of the metal citrates (Pb-Nb, Me-Nb) behave in exactly the same way as the individual components.

Accordingly, the principal object of the present invention is to provide a process for the production of perovskites which does not have the disadvantages of the prior art.

SUMMARY OF THE INVENTION

It has now been found that the problem stated above is solved by a process for the production of phase-pure highly reactive lead metal niobates of perovskite structure correspond to the general formula $Pb_3Me(II)Nb_2O_9$ or $Pb_2Me(III)NbO_6$, where Me=Mg, Fe, Co, Ni, Cr, Mn, Cd, Cu and/or Zn, in which perovskite intermediates are obtained from corresponding salt solutions, separated off, dried and calcined at temperatures of 500° to 1000° C., the metal salt solutions being used and reacted with ammonia in the form of citrates.

This process is the subject of the present invention. To produce the citrate solutions, it is of advantage to use corresponding metal compounds, more particularly hydroxide, carbonates and/or nitrates with citric acid. To obtain clear solutions, it can be of advantage to add nitric acid in small quantities.

Particularly good results are obtained when the niobium component is introduced into the metal citrate solution in the form of niobium hydroxide or niobic acid dissolved in citric acid.

The metal citric solution obtained in accordance with the invention may advantageously be further processed in two ways. If the quantity of ammonia is gauged so that a pH value of 2 to 5 is established in the solution, a perovskite intermediate is precipitated as a solid. This solid may then be separated off in the usual way, dried and calcined to the end product. It is particularly surprising that precipitation only occurs with ternary or higher mixtures. More than 90% of the components can be precipitated even from a relatively dilute solution (1-molar) at pH≦6 and can be converted into the perovskite by calcination.

If the pH value is increased beyond 6, the entire precipitate redissolves.

In another embodiment of the process according to the invention, the perovskite intermediate is obtained in the form of a gel by concentration of the metal citrate solution at a pH value above 6.

This gel can be freed from water and calcined. In a particularly advantageous embodiment, this is done by crystallization of the gel with addition of organic solvents, more especially alcohols and/or ketones.

By virtue of the fact that the starting materials are relatively inexpensive and much easier to handle, the process according to the invention is a more economic method than the alkoxide process. This citrate process gives highly reactive intermediates which can reacted even at very low temperatures.

Thus, the pyrochlore phase is obtained from the precipitated intermediate at only 300° C. The pyrochlore changes into perovskite at only 500° C. With a calcination time of 4 h at 700° C., the percentage perovskite content is more than 85%.

The calcination temperatures are dependent on the perovskite to be calcined. However, in view of the high reactivity of the intermediates obtained by the process according to the invention, they are distinctly lower than in the ceramic process. In a particularly advantageous embodiment, calcination is carried out over a period of 30 minutes to 4 hours.

Since most metal citrates are soluble in water (Zn, Co, Mg, Ni, Fe, etc.), it is also possible in this process to produce a multiple-component compound. Particularly preferred metals (Me) are magnesium, nickel, iron and/or zinc.

DETAILED DESCRIPTION OF PREFERRED EMBODIMENTS

The following Examples are intended to illustrate the invention without limiting it in any way.

The niobium citrate used as starting material in the following Examples was prepared as follows:

4066 g filter-moist niobium hydroxide (25.45% Nb) were mixed with 4680 g citric acid. A clear solution was formed by addition of small quantities of ammonia solution and stirring for several hours at 70° C. The solution had a pH of 0.1 and a density of 1.42 g/cm$^3$.

EXAMPLE 1

50 ml of a niobium citrate solution (165 g $Nb_2O_5$/l) were mixed with 2.85 g magnesium hydroxide carbonate. After the magnesium component had completely dissolved, 24.2 g lead(II) hydroxide carbonate were added. Since the lead compound did not dissolve completely, approx 12 ml conc. nitric acid (65 percent) were added to the suspension. The clear solution was adjusted to a pH value of 5 by addition of $NH_4OH$ (25 percent aqueous solution). Precipitation occurred after the addition of only 1 ml $NH_4OH$. The white precipitate was filtered, dried and subsequently calcined at 850° C. The yield amounted to more than 90%. The perovskite formed contained <5% pyrochlore.

EXAMPLE 2

47.5 g $Fe(NO_3)_3.9H_2O$ and 76.7 g $Pb(NO_3)_2$ were added to 100 ml of a niobium citrate solution (154 g $Nb_2O_5$/l). To obtain a clear solution, the mixture had to be diluted with approx. 150 ml $H_2O$. The solution was concentrated to a pH value of 4.5 by addition of ammonia (25 percent aq. sol.), after which precipitation occurred.

The product filtered off and dried was calcined for 1 hour at 850° C. A perovskite containing <2% pyrochlore was obtained.

EXAMPLE 3

5.6 g magnesium hydroxide carbonate were added to 100 ml of a niobium citrate solution (161 g $Nb_2O_5$/l). After the magnesium component had dissolved completely, 47.06 g lead(II) hydroxide carbonate were added. Since the lead compound had not dissolved completely, even after a relatively long time, 24 ml of a concentrated nitric acid (65 percent) was added to the suspension. The clear solution was adjusted with ~70 ml ammonia (25 percent aq. sol.) to pH7.

The solution was concentrated with heating until a clear gel was obtained. After the gel had been dried at 110° to 150° C., it was calcined for 2 hours at 850° C. A perovskite containing <2% pyrochlore was obtained.

EXAMPLE 4

Methanol was added to an subsequently stirred with the gel obtained as described in Example 3. Crystallization occurred immediately after addition of 200 ml the alcohol. After the gel had crystallized completely, it was filtered, dried and then calcined for 4 hours at 850° C. A perovskite containing <2% pyrochlore was again obtained (yield>99%).

EXAMPLE 5

47.5 g $Fe(NO_3)_3.9H_2O$ and 76.7 g $Pb(NO_3)_2$ were added to 100 ml of a niobium citrate solution (154 g $Nb_2O_5$/l). To obtain a clear solution, the mixture had to be diluted with approx. 150 ml water. The solution was adjusted with ammonia (25 percent aqueous solution) to a pH value of approx. 7 and was then concentrated until a clear gel was obtained. After the gel had been dried at 100° to 150° C., it was calcined for 1 hour at 850° C. A perovskite containing <2% pyrochlore was obtained.

EXAMPLE 6

The gel obtained as described in Example 5 was crystallized with 200 ml methanol and filtered on completion of crystallization. The crystallizate was dried at 100° to 150° C. and then calcined for 2 h at 850° C. The yield amounted to more than 99%. The perovskite obtained contained only about 1.6% pyrochlore.

We claim:

1. A process for the production of phase-pure highly reactive lead metal niobates of perovskite structure corresponding to the general formula $Pb_3Me(II)Nb_2O_9$ or $Pb_2Me(III)NbO_6$, where Me=Mg, Fe, Co, Ni, Cr, Mn, Cd, Cu and/or Zn, in which a perovskite intermediate is obtained from a corresponding salt solution of Pb, Nb, and Me separated off, dried and calcined at temperatures of 500° to 1000° C., characterized in that said salt solution is in the form of citrates and is reacted with ammonia to effect formation of the perovskite intermediate, the phase-pure highly reactive lead metal niobates so produced having less than 5% pyrochlore content.

2. A process as claimed in claim 1, wherein Nb is introduced into the citrate solution in the form of niobium hydroxide or niobic acid dissolved in citric acid.

3. A process as claimed in claim 2, wherein the calcination is carried out over a period of 30 minutes to 4 hours.

4. A process as claimed in claim 1, wherein the calcination is carried out over a period of 30 minutes to 4 hours.

5. A process as claimed in one of claims 1 to 4, characterized in that Me=Mg, Ni, Fe and/or Zn.

6. A process as claimed in one of claims 1 to 4, characterized in that the perovskite intermediate is obtained as a solid at a pH value in the range from 2 to 5.

7. A process as claimed in one of claims 1 to 4, characterized in that the perovskite intermediate is obtained as a gel by concentration of the reacted citrate solution at a pH value above 6.

8. A process as claimed in claim 7, characterized in that the gel is crystallized prior to calcination with the addition of one or more organic solvents selected from alcohols and ketones.

* * * * *